UNITED STATES PATENT OFFICE.

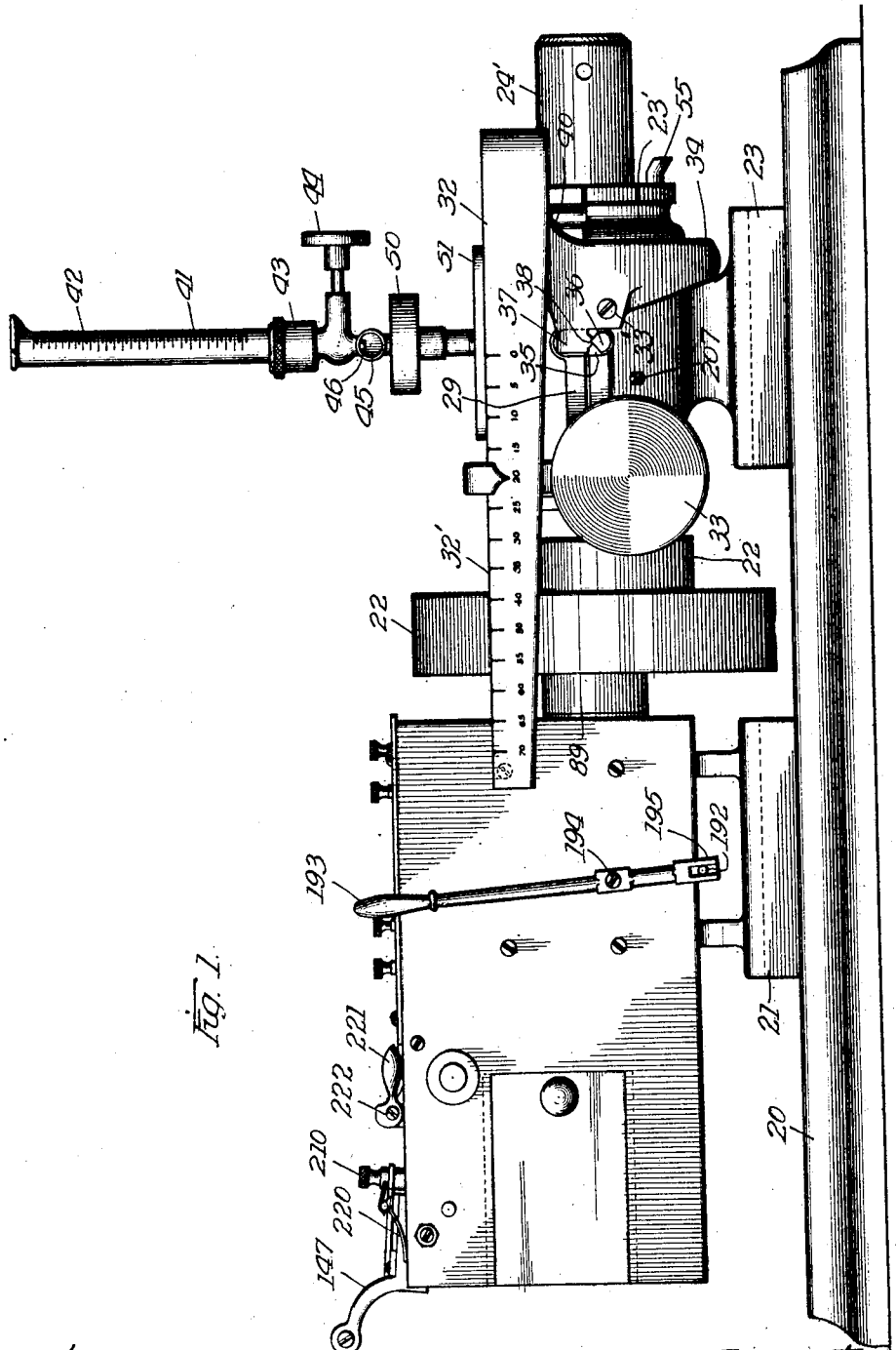

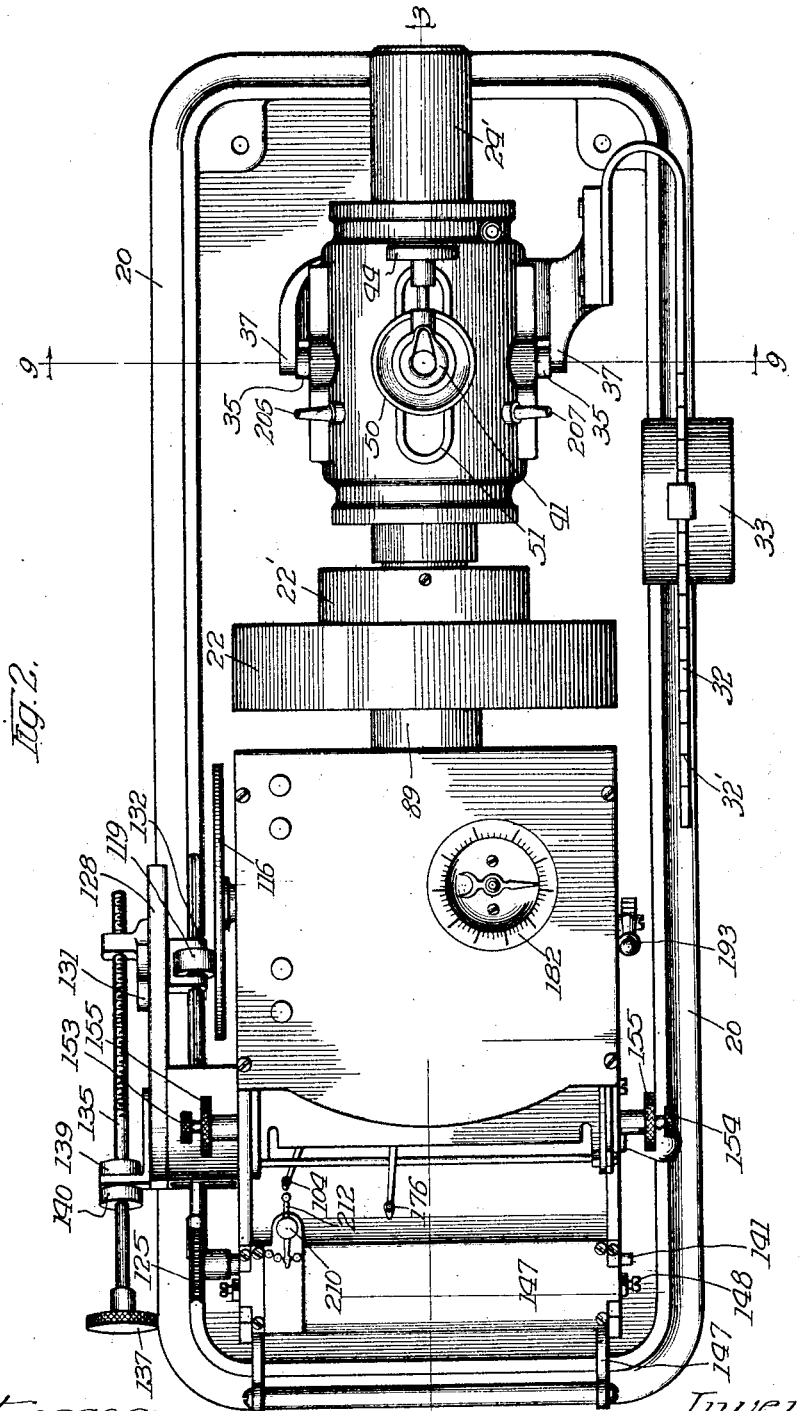

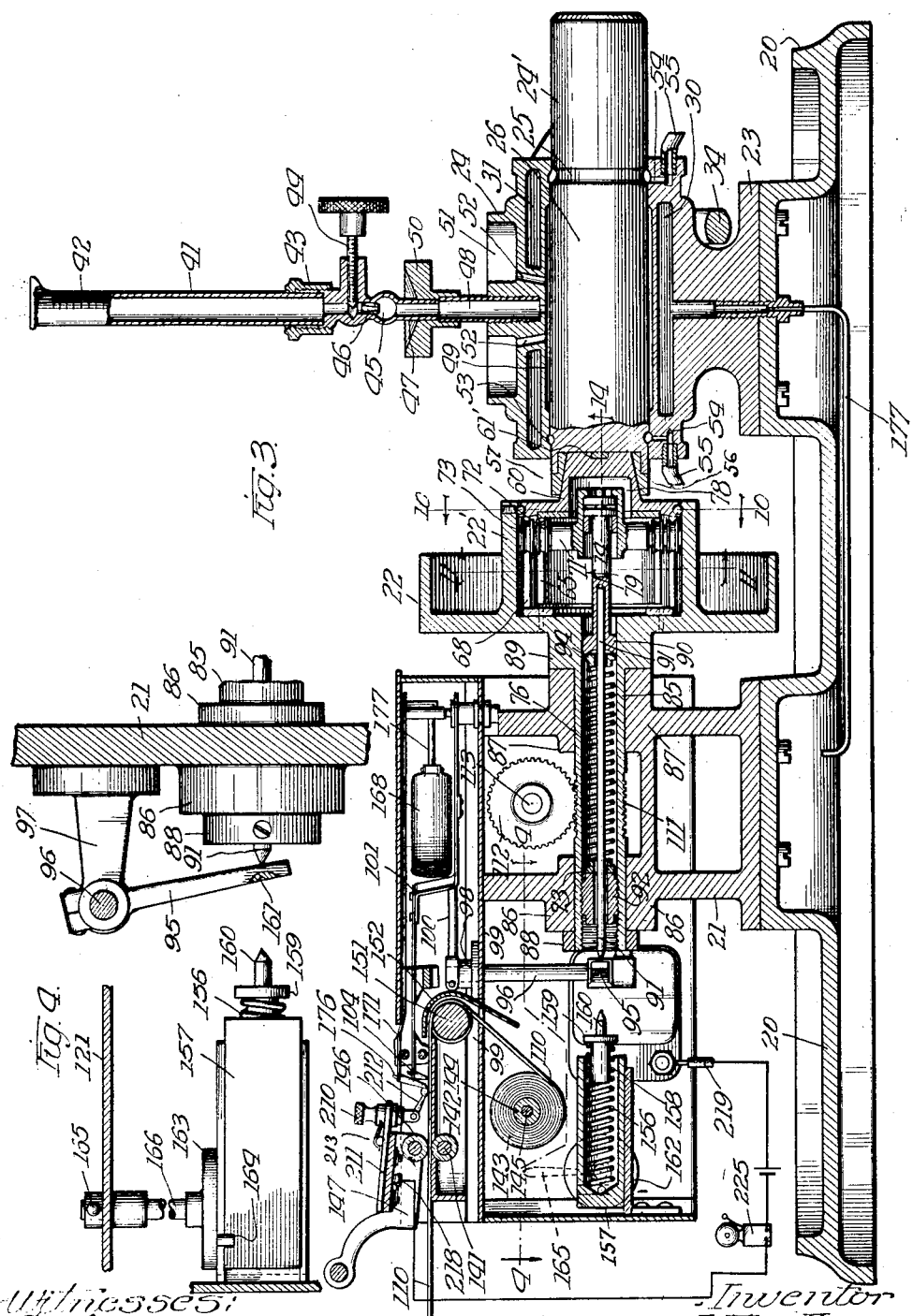

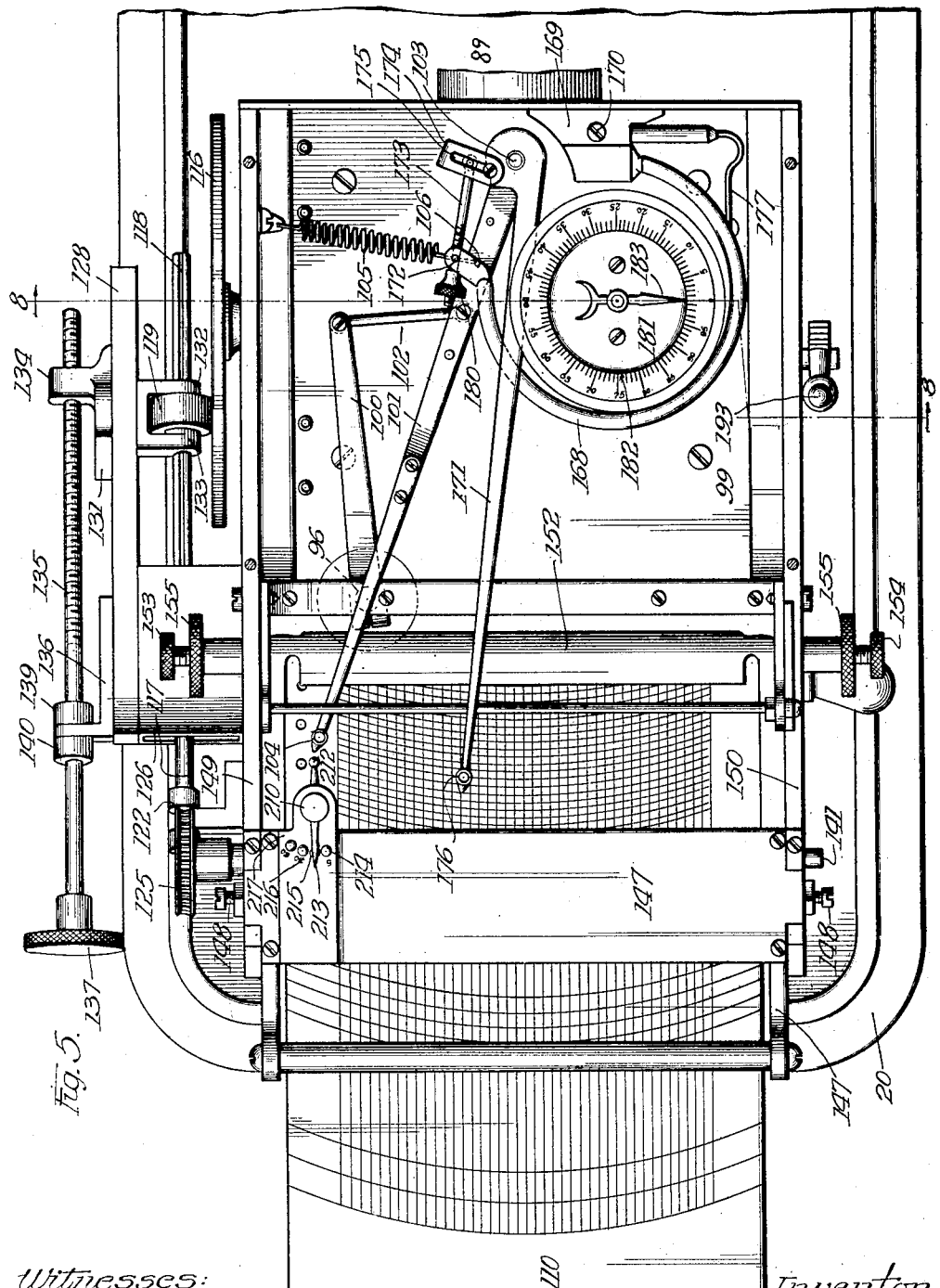

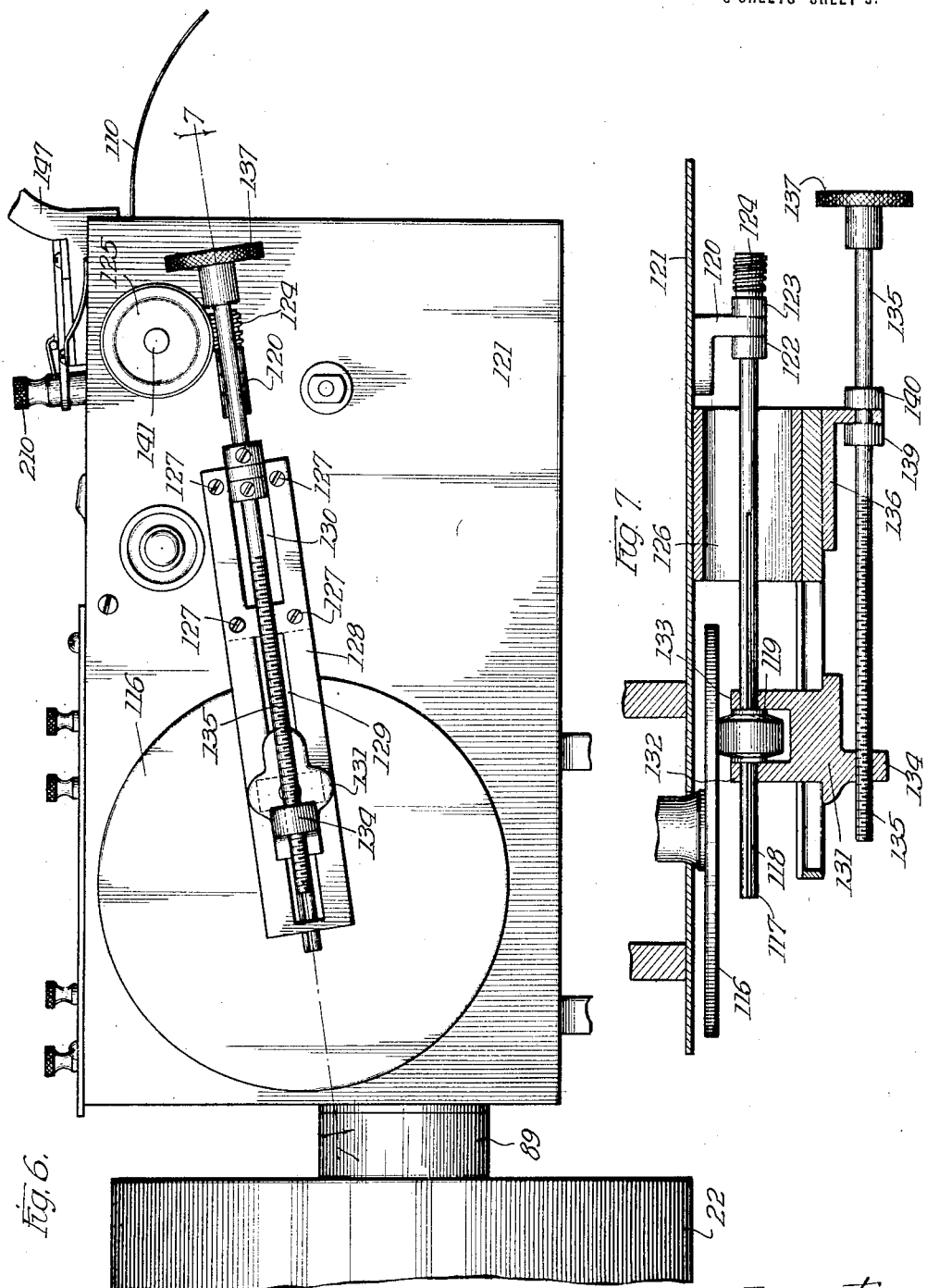

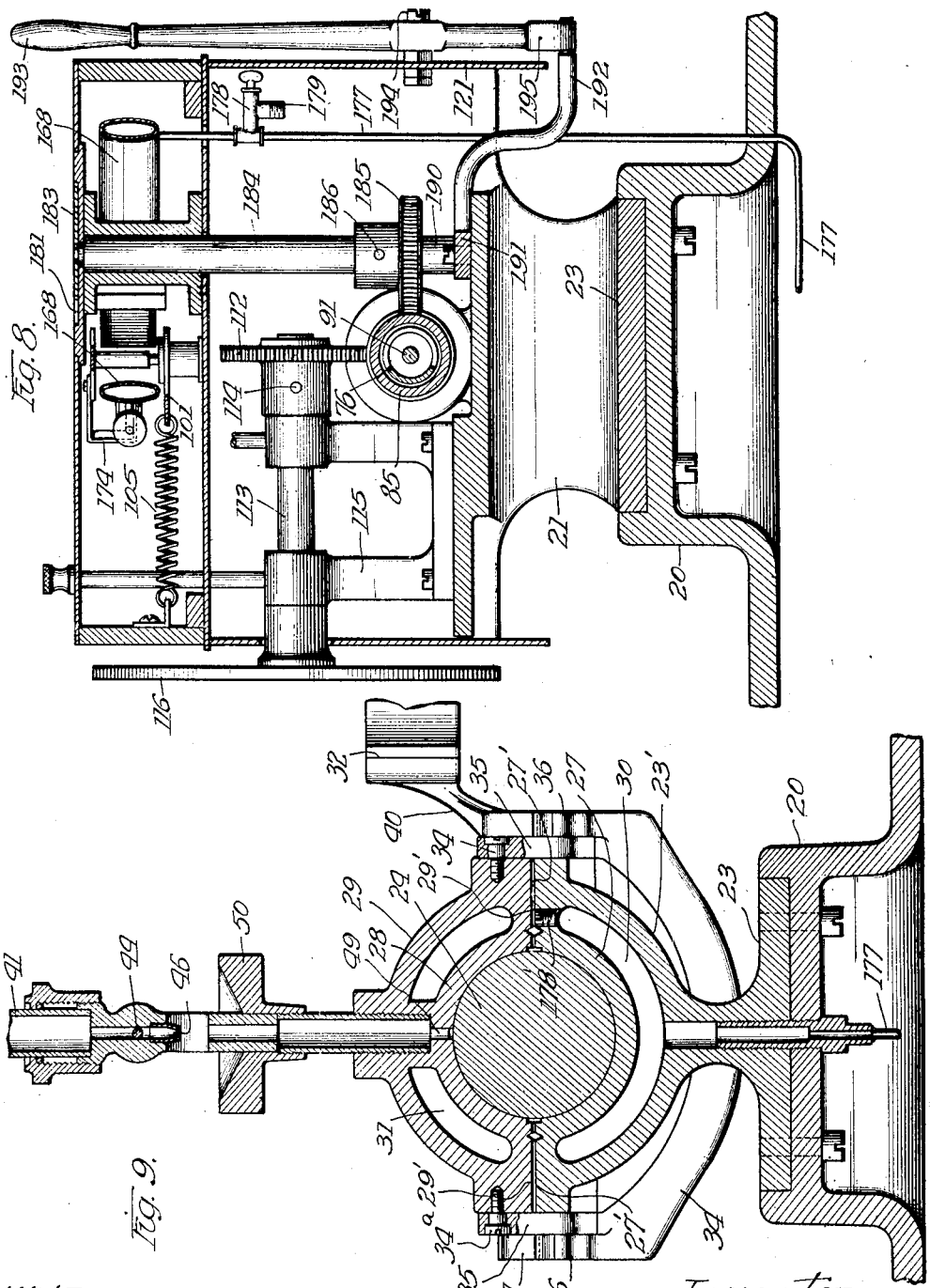

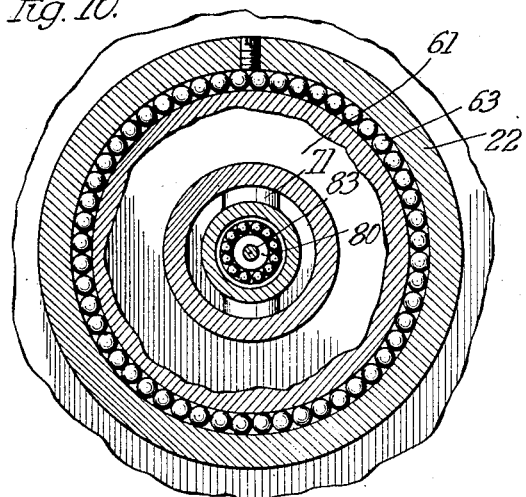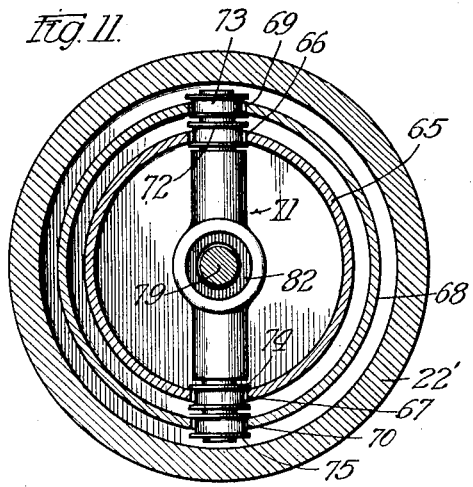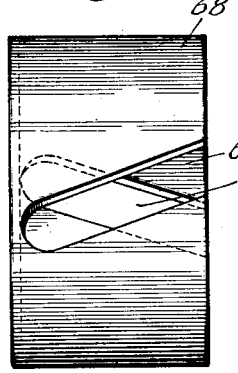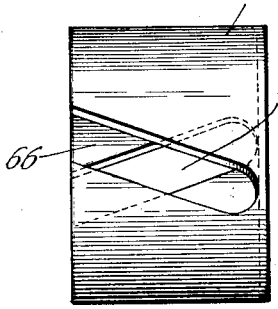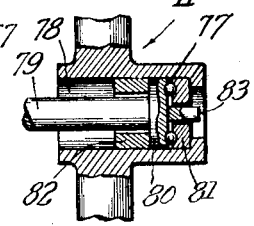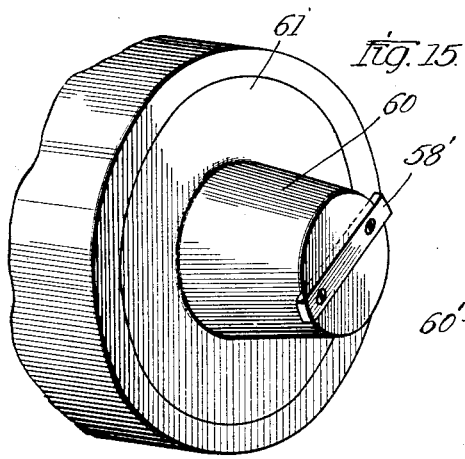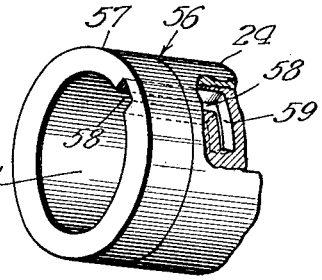

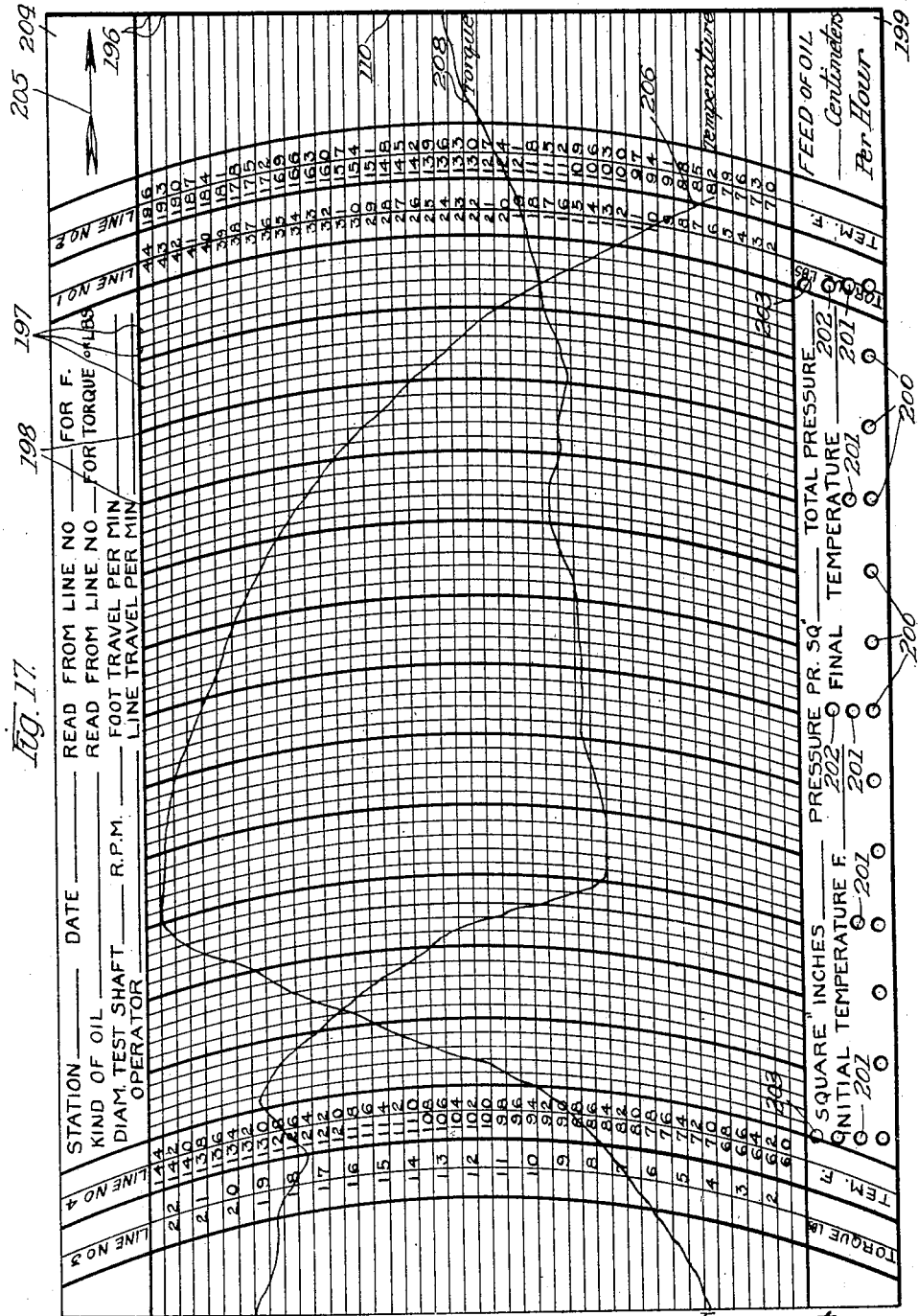

VANDIVER J. VAN HORN, OF CHICAGO, ILLINOIS.

LUBRICANT-TESTING MACHINE.

1,386,214.   Specification of Letters Patent.   Patented Aug. 2, 1921.

Application filed October 4, 1916. Serial No. 123,639.

*To all whom it may concern:*

Be it known that I, VANDIVER J. VAN HORN, a citizen of the United States, residing at Chicago, in the county of Cook and State of Illinois, have invented certain new and useful Improvements in Lubricant-Testing Machines, of which the following is a specification.

My invention relates to improvements in testing machines for determining and recording the characteristics of fluid and semi-fluid lubricants.

One of the objects of my invention is to provide an improved machine for ascertaining the durability and lubricating qualities of fluid and semi-fluid lubricants under varying temperatures and co-existent torque stress, or resistance to rotation, of a driven part anointed with a lubricant under test.

Another object of my invention is to provide means, in a testing machine, whereby a continuous characteristic curve of temperatures, of the lubricant under test, due to the resistance to rotation interposed by the driven part or rotor, is recorded on a constantly moving chart or card strip, preferably of a peculiar character—which card is also a subject of my invention—and whereby an additional characteristic curve of the interposed torque resistance, under varying changes of temperature is coördinately recorded on said strip.

Another object of my invention is to provide means, in said machine, whereby to quickly raise or lower the temperature of the driven part, and the lubricant under test, by the use of extraneously introduced heating or cooling agencies, such as a flame, water, or the like, so that the card readings may be made to start at any desired temperature and whereby attendant characteristics under quick changes of temperature may be graphically delineated.

Another object of my invention is to provide an improved card upon which to inscribe the curves that indicate the characteristics of the lubricant under conditions simulating those to be encountered in ordinary use.

Other and further objects of my invention will become readily apparent to persons skilled in the art, from a consideration of the following description when taken in conjunction with the drawings, wherein:—

Figure 1 is a side elevation of the testing machine.

Fig. 2 is a plan view thereof.

Fig. 3 is an axial vertical section of the machine.

Fig. 4 is an enlarged sectional view taken on line 4—4 of Fig. 3.

Fig. 5 is an enlarged plan view of the recording part of the machine with the cover plate removed.

Fig. 6 is a side elevation of part of the mechanism for calibrating the speed of the moving strip or card upon which the characteristic curve of the lubricant under test is made.

Fig. 7 is a section taken on line 7—7 of Fig. 6.

Fig. 8 is a section taken on line 8—8 of Fig. 5.

Fig. 9 is an enlarged transverse section taken on line 9—9 of Fig. 2.

Fig. 10 is a section taken on line 10—10 of Fig. 3.

Fig. 11 is a transverse section taken on line 11—11 of Fig. 3.

Fig. 12 is a perspective view of one of the torque-responsive cams for moving the mechanism controlling the recording index which sweeps over the moving strip.

Fig. 13 is a perspective view of one of the torque responsive cams, which in coöperation with the cam shown in Fig. 12 operates to move the mechanism that controls the index or marking lever for producing the characteristic curves inscribed upon the moving strip or sheet for indicating the torque load imposed by the driven member or rotor.

Fig. 14 is a section taken on line 14—14 of Fig. 3.

Fig. 15 is a perspective view of the rotatable driving member showing the means of coupling it to the member to be rotated, shown in Fig. 16.

Fig. 16 is the complementary coupling means.

Fig. 17 is a chart or card upon which the characteristic curves of torque and temperature, heretofore referred to, are to be inscribed.

In all the views the same reference characters are employed to indicate similar parts.

In United States Letters Patent No. 1,194,850 granted to John W. Lowry, August 15th, 1916 for a lubricant testing machine, there is disclosed certain construction characteristics that are, to a greater or less extent, necessarily present in the embodiment of my invention. For example, each machine contains a rotatable spindle, driven member or rotor to be anointed with the lubricant undergoing the test, clamped, more or less tightly in its bearings, by weights movable along a graduated bar or lever to adjust the degree of pressure or clamping effect produced by the bearing members, or the two part box, upon the driven member therein, thereby to vary the torque stress, or resistance to rotation imposed upon the driving member by the lubricated driven member. In both structures there is present an index-moving mechanism, operable by the lag of the driven member or the rotative displacement of the driven member relatively to the driving member, which effect is indicative of or measurable in terms of foot-pounds or torque load.

When the driven member is dry, or without a covering or film of the lubricating medium to be tested, with a given clamping compression, the resistance to rotation imposed thereby is at its maximum. The extent to which the resistance is reduced, by the presence of the lubricant, to a large extent, determines the value of the lubricant under test to minimize friction between the relatively moving surfaces.

Temperature, however, has a modifying effect upon the virtue of the lubricant and is a necessary concomitant to be taken into consideration when determining the value of the friction-reducing medium.

Each lubricant has a constitutional characteristic peculiar to itself, especially under varying temperature conditions and the extent of pressure exerted upon the lubricated driven member. It is to quickly ascertain and record these changing phases of the lubricant upon a continuously moving chart, or strip with which my invention is especially concerned.

In the chosen embodiment of my invention, exemplified by the accompanying drawings, there are present certain novel refinements and improvements not heretofore disclosed in the prior art, and which will be hereinafter more fully referred to and specifically pointed out in the appended claims.

On the base 20 is mounted a standard 21 which supports the driving member 22, preferably a pulley to be rotated by a belt or the like, not shown.

The standard 23 supports a removable driven member or rotor 24, coaxially arranged with the driving member 22. The driven member, rotor or rotatable mandrel 24, is provided with an extension 24' which serves as a handle for removing the rotor from its bearing. A groove 25 separates the handle portion 24' from the bearing portion 26 and defines the operative area of the rotor. The driven member or rotor 24, is rotatable in a two part box, the lower portion 27 is shown as an integral part of the standard 23, the upper portion 28 is an integral part of a removable cap 29 which constitutes the upper portion of the two part box. The lower bearing 27 of the box is separated from the box proper 23' by a semi-circular space 30 which surrounds nearly one-half of the driven rotor 24 and is intended to contain a heat responsive fluid to operate the temperature recording pen to be hereinafter more particularly described.

The upper, relatively loose box member 29 is also provided with a substantially semi-circular chamber 31 to contain a cooling or heating medium for cooling or heating the lubricant under test in a manner hereinafter to be more specifically pointed out.

To produce a uniform stable movement of the arm or index employed for indicating and recording the extent of torque resistance, it is necessary that the removable box member 29 should be superposed and poised in contact with and on the rotor 24 in such manner that the confronting edges 27' and 29' on each side of a vertical plane passing through the axis of the rotatable member 24 should not be brought into actual contact. This effect results in producing a disturbing condition of the recording index causing it to jump and vibrate violently when the surfaces referred to are intermittently brought into contact and withdrawn from contact in the operation of the machine. To prevent this disturbing influence and to make the recording agency more dead-beat, I provide a means for holding the box member 29 on the relatively stationary box member 23' in poised position substantially as shown in Fig. 9 by the compensating lever 32 which is also provided with a bar graduated for the weight 33. The lever 32 is pivoted to the box member 23', as at 33, on each side of the said box member and is provided with a yoke part 34 which extends around and is pivoted to the opposite side of the fixed box member. Secured to each side of the upper loose box member 29, as by a screw 34ª, is a plate 35 having an outwardly extending lug, or balancing point 36, the upper, or contact portion of the balancing point being in substantially the same horizontal plane as the axis of the driven member 24. Projecting laterally from the yoke piece 34 of the lever 32, is a lug 37 having a coöperating pivotal depression or indentation 38, for overlying the pivotal point 36. A lug of this character is present on each side of the yoke piece 34. The lever 32 is pivoted on the points 36 and 38, on opposite sides of the axial median vertical plane of the driven member 24, and thereby holds the removable box member 29 in a central poised position, as clearly shown in Fig. 9, thereby preventing contact of the surfaces 27' and 29' on the respective box members.

A bracket 40 projects vertically and rearwardly from the yoke member 34 and terminates in a uniformly graduated bar 32' upon which the weight 33 is adapted to be longitudinally moved. The bar 32' is graduated in values representing pounds-per-square-inch pressure exerted by the weight 33 upon the driven member 24. In Fig. 1, the weight is shown to indicate "20" on the graduated bar 32', which signifies that there are 20 pounds pressure per square inch exerted by the loose box member 29 in contact with the driven member 24, when the weight is in the position shown. If the weight be moved along the bar, or beam 32', until it indicates 40, for example, its new position would signify that there are 40 pounds pressure per square inch being exerted upon the driven rotor 24 by the effect of the weight 33 and the lever 32.

A burette, or substantially transparent tube 41 graduated in cubic centimeters, as at 42, is a receptacle provided for holding the fluid undergoing test. The lower end of the tube is secured to the fitting 43 and a needle-valve 44 is adapted to control or regulate the amount or quantity of oil, or other lubricating fluid, that will pass from the burette into the opening below. An orifice 45 is preferably made below the nozzle 46 so as to render visible to the operator the oil, or other lubricant under test, as it drops from the nozzle. The lubricant will drop from the nozzle 46 through the aperture 45 into the tube 47 from thence into the tube 48 and finally it will pass into the groove 49 immediately above the rotor or driven member 24, there to be evenly distributed over the bearing surface 26 of said rotor. A drip cup 50 surrounds the tubes 47 and 48 and serves as a coupling for the tubes, at the same time it will catch any drippings that may come from the burette.

An annular cavity 51, provided with communicating openings 52 into the groove 49 immediately above the rotor surface 26, is a receptacle to contain hard grease or other semi-fluid lubricants, which are not sufficiently fluid to pass through the conduit from the burette 41 and the needle valve 44. By placing the semi-fluid lubricant, such as hard grease or the like, in the receptacle 51, it is therein subjected to substantially the same conditions that obtain when it is used in actual practice. The heat evolved from the rotor will cause the grease to melt and to flow down through the openings 52, there to be distributed in a more fluid state in the axially extending groove 49.

As the lubricant under test is introduced near the longitudinal center of the surface 26 of the rotor, that which has been used will be forced out near the end thereof into the grooves 25 and 53 and thence through the openings 54 through the drip pipes 55, by introduction of fresh fluid.

The inner end of the rotor 24 carries a coupling member 56 consisting of an internally tapered ring 57 having an internal axially extended slot 58 and a connecting, circumferentially extending slot 59, thus to form a centering connecting means with the hollow tapered gudgeon 60 and a cross bar 58' carried by the driving member 22. The bar, together with the slots 58 and 59 provides a bayonet joint between the two members. A disk 61 is a part of the hollow tapered gudgeon 60, the outer edge of which is provided with a groove for containing the friction-reducing balls 63, whereby the disk 61 is supported in the sleeve 22' of the driving member 22, so that any rotary displacement of the driving and driven members may be effected with the smallest attendant resistance or friction. The cup-shaped cam 65, is secured to the disk 61 by suitable means, and rotates positively therewith. It is provided with cam slots 66 and 67 which extend in planes that are oblique to its axis. The cam slots 66 and 67 are diametrically disposed on opposite sides in a manner clearly shown in Fig. 13. The cam cup 65 is spaced apart from and adapted to lie within the larger cam cup 68, which is in every respect similar to the cam cup 65, with the exception that the slots 69 and 70 extend in opposite directions with respect to the slots 66 and 67 of the smaller cam. The cam 68 is secured to the driving member 22 and is positively rotated therewith.

A torque transmitting member 71 carries on each of its outer ends two small flanged independently rotatable pulleys, or wheels, 72, 73, 74 and 75. These pulleys are contained in the cam slots 66 and 67, 69 and 70, respectively. Any rotative relative displacement of the cams 65 and 68 will cause the torque transmitting member 71 to be moved axially of said cams. The torque-responsive member 71 is the means for moving the mechanism which operates the index, hand or marker, that graphically records the relative resistance to rotation imposed by the lubricated rotor 24. Normally the member 71 is held in the position shown in Fig. 3 by a compression spring 76.

The torque transmitting member 71 is provided with a hollow hub 77 which is normally contained in an opening 78 from the disk into the hollow tapered gudgeon or trunnion 60. An axially positioned stem 79 extends into the opening 78, in the hub of the member 71, and carries on its inner end an enlarged washer or disk 80, which is hardened to provide one member of a thrust ball-bearing of which the other member 81 is perforate and stationary within the hub.

A ring 82 is placed in the opening 78 of the hub and prevents the withdrawal of the stem 79. A small projection 83 from the stem 79 may find bearing in the disk 81.

A prolonged hollow sleeve 85, which is preferably an integral part of the driving member 22, is supported in the bearing-hubs 86 and 87 of the standard 21. It is held against axial movement by a nut 88 in coöperation with a shoulder 89 on the other end of the sleeve. The stem 79 is provided with an enlarged head 90 which fits in the axial bore of the sleeve 85. This head serves as a guide for the axial movement of the stem 79 when the torque-responsive member 71 is axially moved by the torque-responsive cams. The stem 79 is also provided with an axial bore to receive a somewhat smaller but longer stem 91 which extends through the sleeve 85 and projects slightly beyond the free end thereof. It is surrounded by the open compression spring 76 which is capable of adjustment by the screw threaded abutment 92 and which is bored to permit the stem 91 to pass therethrough. By adjusting the abutment 92 the tension of the spring 76 may be varied. The ends of spring 76 are carried by followers 93 and 94 which surround the smaller stem 91 and which press against the head 90, of the stem 79, and the adjustable abutment 92 at the free end of the sleeve. By this means resistance to movement of the axially movable member 71 may be varied.

The outer end of the axially movable stem 91 bears against an arm 95 that is secured to a vertically extending shaft 96. The lower end of the shaft 96 finds bearing in the standard 97 and extends upwardly through a bearing 98, carried by the plate 99, where it is fixed to another arm 100. The arm 100 is pivotally connected to an index, or marking pen 101, by link 102. The index is loosely pivoted at 103 and carries on its outer end a stylus or marking pen 104, where it is shown in its retracted position. A spring 105 is connected to the arm 101, as at 106, and normally holds the arm in its retracted position, and it furthermore holds the arm 95 in intimate contact with the projecting end of the stem 91. From this arrangement it will be understood that when the cam-connecting member 71 is moved axially, as a result of the relative rotative displacement of the torque-responsive cams, the indicating needle, or stylus 100 is moved in a generally transverse direction across the chart strip 110 and inscribes a characteristic torque-indicative curve thereon. The constant movement of the chart strip and the transverse movement of the pen 104 thereon, produce a consequent line or curve delineation which represents the changing torque effect interposed by the driven member 24 thereby graphically illustrating this characteristic of the lubricant under test.

The chart strip 110 is constantly moved at substantially uniform speeds by the driving member 22. The sleeve 85 is provided with a worm or screw threaded part 111 which meshes with the worm wheel 112 and rotates a worm wheel at a given ratio with the rotation of the sleeve 85. The worm wheel 112 is secured to a transversely extending shaft 113, as by pin 114. The shaft is supported in bearings on a standard 115 and carries on its outer end a driving friction disk 116.

The chart, or strip upon which the characteristic curves of temperature and torque are to be delineated, is moved by the following mechanism. A shaft 117 is provided with a spline 118 and is positioned substantially parallel with the face of the driving friction disk 116. The shaft 117 carries a small feathered friction pulley 119, of suitable material, having a rather high frictional coefficient which is adjustably movable across the face of the friction driving wheel 116, on the shaft 117. The other end of the shaft 117 finds bearing in a bracket 120 which is fixed to the side plate 121 of the machine frame. Collars 122 and 123, one on each side of the bracket 120, are secured to the shaft and prevent any axial movement thereof. This end of the shaft also carries a worm 124 which is in driving relation with the worm wheel 125. The shaft 117 extends through a hollow box-support 126. The plate 128 is secured to the support, as by screws 127. The plate is provided with an axially-extending substantially central slot 129. A bracket 131 extends through and is slidable in the slot 129, and carries on its inner end two arms 132 and 133, one on each side of the friction pulley 119, and projecting outwardly from the bracket is a threaded arm 134 to receive a threaded adjusting screw 135. The adjusting screw 135 is rotated by the thumb nut 137 and when rotated serves to move the bracket 131 across the face of the disk 116, thereby causing the friction pulley 119 to make contact with the face of the disk at various points in a horizontal radial plane on the disk 116 to vary the speed of the shaft 117, in order to calibrate the time-rate of movement of the chart or strip 110, upon which the characteristic cards are to be inscribed. By turning the screw shaft 135, by the thumb button 137, the friction wheel 119 is moved toward or from the axis of the friction disk 116 and thus the speed of movement of the chart strip 110 may be regulated or adjusted with reference to the speed of the driver 22. Collars 139 and 140 are placed upon either side of the bracket 136 to prevent axial movement of the screw 135. The worm wheel 130

125 is carried upon a shaft 141 which extends transversely of the machine and which, on its central part, carries a drum 142, preferably of semi-vulcanized rubber for driving the chart-strip 110. The strip is wound upon a roll 143, that is contained upon a spool 144 which is freely rotatable upon a relatively stationary shaft 145. A similar, spring-pressed roller 146 is mounted immediately above the strip-driving roller 142, in a frame 147, which is pivoted by screws 148—148 in the frame members 149 and 150. By this means the strip 110 is driven at uniform speed and the speed-time calibration can be effected by turning the screw 137 to adjustably move the driven friction pulley 119 along the face of the driving disk 116. By this means the strip 110 will be fed a given length within a given time to coöperate with the speed of rotation of the driver 22.

In threading this strip 110 in place, it is first brought over the roller 151, under the shield 152, and is then passed between the rollers 142 and 146. The roller 151 is held in place between the adjustable screws 153, 154 which take through the side frames 149 and 150 of the machine. The screws are held in adjusted position by the set nut 155.

When an oil is being tested in which the lubricating qualities are at a relatively low value, especially attendant with a large rise of temperature, the sweep of the index arm which describes the torque curves upon the moving chart strip will be greater than the width of the chart and therefore in order to delineate the characteristics of such an oil, it is necessary to reduce the relative movement of the index arm by increasing the tension of the opposing spring 76. To accomplish this I provide an auxiliary compression spring 156 in the same axial plane, which may be thrown into conjoint use with the spring 76 under the conditions mentioned. The spring is contained in a slidable casing 157, which is axially moved, to bring the spring into use. Its outer end is wound around a stem 158 having an abutting disk 159 and a projecting point 160. The point 160 is adapted for engagement with a depression or cavity 161 provided in the arm 95, when the casing 157 is moved toward the arm to its fullest extent. The casing 157 is mounted upon a bracket 162 which guides it in its movement, and is moved forwardly and held in fixed position by an eccentric device, consisting of a disk 163 and a pin 164, located at one side of the axis 166 of the eccentric, entering an orifice in the casing 157. A handle 165 is the means for rotating the eccentric whereby when the handle 165 is moved 90 degrees, from the vertical position shown in Fig. 4, the casing 157 will be moved axially until the point 160 will engage the arm 95 by entering the indented cavity 161 therein, thus affording reinforcement to the spring 76, by the spring 156, which jointly resist the movement of the arm 95. Further reference to this device will be made hereinafter when the chart is more specifically described.

Mounted upon the top plate 99 of the machine is a Bourdon tube 168, having one of its ends fixed in a hollow bracket 169 which is secured to the plate 99, as by screws 170. The tube 168 is pressure responsive, the pressure being produced by expansion of the liquid contained therein. An index or stylus 171, is the means for describing the temperature curve on the chart 110. It is pivoted, as at 103, and is connected to the free end 172 of the Bourdon tube by an adjustable link 173. A bracket 174 projects radially from the axis of the recording index or lever 171, and contains a slot 175 within which the end of the link 173 is adjustable, so as to change the relative movement of the tube 168 and the index lever 171, for the purpose of calibration. When the end of the link 173 is moved to the far end of the slot 175, in the bracket 174, the index 171 will have a smaller movement, with relation to the free end 106 of the Bourdon tube and when the link 173 is moved in the slot 175, so as to occupy a position nearer the index 171, the index will have a larger relative movement than theretofore. 176 is the pen or stylus terminal for making the indication or trace upon the chart 110 when the index is moved thereon.

The interior of the Bourdon tube 168 is connected by a pipe or tube 177 to the cavity 30 below the bearing 27. In the pipe 177 there is a needle valve 178 which closes a pump connection 179, through which to fill the pipe, the Bourdon tube and the cavity 30 under the rotor 24, to which the pipe 177 is connected. A sensitive heat-responsive fluid is pumped into the cavity, the pipe 177 and the Bourdon tube, a vent 178′, shown in Fig. 9 being left open to permit escape of air when the liquid is pumped into the receptacles referred to. The liquid used for the purpose has a large expansion coefficient for temperature variations such as ether, tetrachlorid of carbon, low flash gasolene, or other like volatile fluid or gas. When the system referred to has been substantially filled with the expansion fluid medium, under slight normal pressure, as described, the needle valve 178 is then closed. The rise of temperature of the liquid contained in the semi-circular cavity 30 immediately under the bearing supporting the rotor 24, will cause it to expand, the effect of which is to tend to straighten out the Bourdon tube, substantially proportional to the rise of temperature, the further effect of which is to move the index 171 substantially in a transverse direction across the moving chart-strip 110. The index 171 will thus become responsive to and record on the chart-strip, a curve characteristic of the change of temperature produced by the rotating driven member, or rotor 24.

While the recording indices 101 and 171 are pivoted on practically the same axis, the former is in a lower plane than that of the latter, and is shorter, in linear extent, so that there is no interference of one index with the other in their movement across the moving strip.

The point of initial location of the temperature-indicating lever or recording pen 176 may be established by adjustment of the nut 180, on the threaded stem 173 by shortening or lengthening the connecting link.

When it is desirable to ascertain the rate of speed of the driving member 22, this may be accomplished by the revolution counter 181 which consists of a scale 182 divided into 100 equal divisions, indicating 100 revolutions to one revolution of the index 183. The rotatable index is mounted upon a vertical shaft 184, which carries on its lower end a worm wheel 185, secured thereto, as by a pin 186. The worm wheel 185 may be thrown in and out of mesh with the worm 111 carried by the sleeve 85, as clearly shown in Figs. 3 and 8. The lower end of the shaft 184 is stepped in a movable arm or bracket bearing 190 which is pivoted at one end, as at 191, and from which end there projects an arm 192 to a point outside of and below the casing plate 121. To this plate is pivoted a hand operable lever 193, as at 194, and which carries a forked end 195 engaging the outer end of the arm 192. When the hand lever 193 is moved in one direction on its pivot, the shaft bearing end of the swivel bracket 190 is moved toward or away from the worm 111 so that the worm wheel 185 is thereby thrown into or out of mesh with the worm 111, carried by the sleeve 85, and the revolution counter may be connected or disconnected and when in operation it indicates the rate of speed of the driving member 22, and in connection with a watch, or other time piece, the revolutions per minute of the driving member may be ascertained.

After this has been obtained the lever 193 may be moved in the opposite direction when the worm wheel will be thrown out of mesh, in a manner readily understood from a consideration of the particular showing in Fig. 8.

The strip or draft 110 upon which the characteristic curves are to be inscribed is preferably ruled from end to end with continuous spaced-apart, parallel lines 196. Upon these lines, in consecutive order, notations representing torque-stress and temperature are to be placed. A series of spaced apart transversely extending arcuate lines 197 cross the lines 196 and represent uniform periods of lapsed time. The chart or strip is to be moved so that it requires one minute of time for the chart to move under the indicating pen from one of the light lines 197 to the one next to it in progressive order. The spaces between the dark, transversely extending, arcuate lines 198, represent five minutes of lapsed time, as they include five of the lighter lines 197. The transversely extending lines of figures marked "Line No. 1," indicate the torque stress, or the effort required to overcome the resistance imposed upon the driven lubricated member, and are indicative of the torque pounds per square inch. "Line No. 1" contains indicating numerals, progressively arranged from the bottom, from the numeral 2 to the numeral 44. "Line No. 2" on the chart indicates temperature and is provided with a series of designating numerals, progressively arranged from 70, at the bottom, to 196 at the top. "Line No. 1" is used when the reinforcing spring 156 is brought into requisition and the temperature recording arm adjusted in accordance therewith. "Line No. 3" is the torque line with the numerals arranged on alternate, longitudinally extending lines, in consecutive order, from 2 to 22, for use when the reinforcing spring 156 is not employed in connection with the spring 76. In the one case the recording stylus will pass entirely across the strip to indicate 22 pounds torque per square inch, and in the other case it passes an equal distance across the chart or draft to indicate 44 pounds per square inch. In the margins of the strip 110 there is a longitudinally extending space 199 within which is included a series of perforations 200 which are located uniformly at the base of each of the 5 minute time lines 198, or in other words, they are spaced five minutes apart. Another series of perforations, 201, extend longitudinally and are placed 15 minutes apart, and another series 202, are spaced 30 minutes or half an hour apart, while the series 203, are spaced one hour apart, or the length of time required for the entire draft or chart to pass under the recording pens. The significance of the perforations described will be pointed out more particularly hereinafter when reference is made to the means for indicating a signal at specified periods, in the movement of the chart.

The margins 199 and 204 contain certain legends, to be completed by the result of the test, which serve as memoranda for the preservation of the results obtained.

The chart in its progress through the machine moves in the direction of the arrow 205.

The temperature curve 206, it will be observed, started, in accordance with line No.

4 at 68 degrees temperature and rose gradually to 144 degrees temperature, at the expiration of 50 minutes. The torque curve started at 10 pounds per square inch (line No. 3) and slowly descended, or decreased until it reaches 7½ pounds, at the end of 50 minutes, or coördinately with the highest rise of temperature. At this particular time cold water was turned on through the space 31 in the upper part of the box member, through the conduits 206 whereupon the temperature quickly fell, within the space of 15 minutes, from 142 degrees to 96 degrees and continued to fall thereafter until it reached 70 degrees, whereupon the torque stress changed coördinately with the change of temperature and as quickly rose to 19 pounds per square inch, crossing the temperature line at 16½ pounds per square inch.

In practice the inscribed characteristic curve lines are much more uneven than the curved lines depicted in the diagram although the general direction of the lines is substantially the same, thus sensitively indicating the slightest variation of conditions that may occur, spasmodically, in the operation of the test.

Now referring to Figs. 3, 5 and 6, 210 is a rotatable stud supported in an insulated plate 211 and carrying on its lower end a spring-pressed contact-making arm 212, and near its upper end, a radially projecting pointer 213. When the stud 210 is turned so that the arm 213 indicates the button 215, the circuit controller arm 212 is immediately over the series of perforations 202 and will enter the openings 202 and close an electric circuit after the lapse of 15 minute periods, during the progressive movement of the chart. If the stud 210 be rotated so that the arm 213 is immediately over the indication 214, circuit will be closed each five minutes during the progress of the strip, because the circuit-making arm will then pass into the perforations 200, which are located along the margin of the strip at intervals, representing the lapse of five minutes' time. The circuit making arm 212 may thereby be rotated upon its axis 210 until it is moved over any one of the longitudinally extending series of perforations to close an electric circuit to sound a bell, light a lamp or produce other audible or visible indications to call the attention of the testing operator to the chart and the delineations that are being inscribed thereupon. The insulated plate 211 is connected by a wire 218 to a suitable circuit source of current and translating device that may be employed for expressing the signal. The return wire 219 is connected to the body-part of the machine for establishing the circuit when the circuit closing arm 212 makes contact with the body part of the machine or the plate therebelow, through any one of the series of perforations made along the edge of the constantly moving strip.

The frame 147, carrying the contact making mechanism, is held depressed by the spring 220, but may be raised so that the contact mechanism will no longer perform the office for which it is intended, by means of the eccentric lever 221, being turned 180 degrees upon its axis 222. This also prevents the feeding mechanism from moving the chart, as it separates the pressure roller 146 which is supported in the frame 147, from the driving roller 142.

While I have herein disclosed with considerable particularity a single embodiment of my invention, it will be manifest to persons skilled in the art, that many changes in the general arrangement, form and configuration of the structure and parts thereof may be varied within the scope, intent and purport of the appended claims.

Having described my invention, what I claim is:—

1. In a machine of the character described the combination of a driving member; a member to be driven thereby; a recording index; a structure movably responsive to relative displacement of said driving and driven members, connected to said index; a strip moved in timed relation upon which to record a curve to be described by said index; means for moving the strip; and means to change the speed of the strip-moving means with relation to the driving member.

2. In a machine of the character described the combination of a driving member; a member to be driven thereby; a recording index; a structure axially movable in response to relative rotative displacement of said driving and driven members, connected to the index, and a strip having spaced-apart lines indicative of lapsed time, moved in timed relation, upon which to record a curve to be described by said index means for moving the strip; and means to change the speed of the strip-moving means with relation to the driving member.

3. In a machine of the character described the combination of a driving member; a member to be driven thereby; a recording index; a structure axially movable in response to relative rotative displacement of said driving and driven members, connected to the index; a strip moved in timed relation upon which to record a curve to be described by said index and a signal, controlled by said strip, made operable at adjustable time intervals; and means for moving the strip.

4. In a machine of the character described the combination of a driving member; a member to be driven thereby; a recording index; a structure axially movable in response to relative rotative displacement of said driving and driven members, connected to the index; a strip, having spaced-apart transversely-extending lines indicative of lapsed time, moved in timed relation, upon which to record a curve, to be described by said index, and means for moving the strip, and a signal, controlled by said strip, made operable at adjustable time intervals uniformly with respect to said lines.

5. In a machine of the character described the combination of a driving member; a member to be driven thereby; a recording index; a structure axially movable in response to relative rotative displacement of said driving and driven members, connected to the index; a strip moved in timed relation, upon which to record a curve to be described by said index, and having perforations at regular intervals through which an electric circuit may be closed, and means for moving the strip, and a circuit closer adapted to enter said perforations to close an electric circuit.

6. In a machine of the character described the combination of a driving member; a member to be driven thereby; a recording index; a structure movable in response to relative rotative displacement of said driving and driven members, connected to the index; a strip moved in timed relation, upon which to record a curve described by said index, and having a plurality of series of longitudinally-extending perforations at regular but variable intervals through either series of which an electric circuit may be closed to produce a signal at corresponding intervals, and means for moving the strip, and a circuit closer adapted to enter said perforations to close a circuit and adjustable for a selected series.

7. In a machine of the character described the combination of a driving member; a member to be driven thereby; means for connecting said members, relatively movable in consequence of rotative displacement, or lag of the driven member; a recording index movable by said connecting means to describe a characteristic curve indicative of the resistance producing the lag; a chart strip movable in time relation, upon which to inscribe a torque curve and means for moving the strip and means to adjust the speed of said strip.

8. In a machine of the character described, the combination of a driving member; a member to be driven thereby; means for connecting the said members, relatively movable in consequence of rotative displacement, or lag of the driven member; a recording index movable by said connecting means to describe a characteristic curve indicative of the resistance producing the lag; a temperature recording means movable in consequence of temperature variation of the driven member to describe a characteristic temperature curve and a receptive surface upon which both curves are made in substantially coördinate relation and means to adjust the speed of said receptive surface with respect to said driving member.

9. In a machine of the character described the combination of a driving member; a member to be driven thereby; means for connecting the said members, relatively movable in consequence of rotative displacement, or lag of the driven member; a recording index movable by said connecting means to describe a characteristic curve indicative of the resistance producing the lag; a temperature recording means movable in consequence of temperature variation of the driven member, to describe a characteristic temperature curve; a chart strip movable in timed relation upon which to inscribe said curves and means for moving the strip and means to adjust the speed of the strip.

10. In a machine of the character described the combination of a driving member; a member to be driven thereby; means for connecting the members, relatively movable in consequence of rotative displacement or lag of the driven member; a recording index movable by said connecting means to describe a characteristic curve indicative of the resistance producing the lag; yelding means to oppose the movement of said index and a similar, supplemental, opposing means shiftable to reinforce the first mentioned opposing means, to limit the extent of movement of said recording index; a chart strip movable in timed relation upon which to inscribe the torque curve and means for moving the strip.

11. In a machine of the character described the combination of a driving member; a member to be driven thereby; a relatively stationary means between which and the driven member the lubricant is to be applied for test; means to record the lag of the driven member; means for yieldingly resisting relative movement between the driving and driven member; means to record the temperature of the driven and stationary member, and extraneous means to raise or lower the temperature of said member.

12. In a machine of the character described the combination of a driving member; a member to be driven thereby; means to record the lag of the driven member; means to record the temperature of the driven member; means for yieldingly resisting relative movement between the driving and driven member; adjustable means to vary the resistance to rotation of the driven member and extraneous means to raise or lower the temperature of the driven member.

13. In a machine of the character described the combination of a driving member; a member to be driven thereby; means to record the lag of the driven member;

means to record the temperature of the driven member, means for yieldingly resisting relative movement between the driving and driven member; and means operable by said machine to produce a signal at definite time intervals.

14. In a machine of the character described the combination of a driving member; a member to be driven thereby; means to record the lag of the driven member; means to record the temperature of the driven member; means for yieldingly resisting relative movement between the driving and driven member; means operable by said machine to produce a signal at definite time intervals and means for varying the duration of the time intervals within which the signals are to be made.

15. In a machine of the character described the combination of a driving member; a member to be driven thereby, a resilient connection between said members, means to record the lag of the driven member; means to record the temperature of the driven member; adjustable means to vary the resistance to rotation of the driven member to produce the lag; and extraneous means to raise or lower the temperature of the driven member.

16. In a machine of the character described the combination of a driving member; a member to be driven thereby, a resilient connection between said members, means to record the lag of the driven member; means to record the temperature of the driven member; adjustable means to vary the resistance to rotation of the driven member, to produce the lag; extraneous means to raise or lower the temperature of the driven member; and means operable by said machine to produce a signal at definite time intervals.

17. In a machine of the character described the combination of a driving member; a driven rotor; a box bearing, within which said rotor is rotatable, having a chamber partly surrounding said rotor; a temperature-responsive fluid within said chamber; a temperature recording index, responsive to said fluid, to describe a temperature curve on the moving surface or strip; a strip moved in timed relation upon which to inscribe the curve, and means for moving the strip.

18. In a machine of the character described the combination of a driving member; a driven rotor comprising an elongated arbor; a box-bearing within which said rotor is rotatable, having a chamber partly surrounding said rotor; a temperature-responsive fluid within said chamber; variable means to clamp the rotor to resist rotation thereof; a temperature recording index, responsive to said fluid to describe a temperature curve on a moving surface or strip; a moving strip upon which to inscribe the curve and means for moving the strip.

19. In a machine of the character described the combination of a driving member; a driven rotor comprising an elongated arbor; a box-bearing within which said rotor is rotatable, having a chamber partially surrounding said rotor; a temperature-responsive fluid within said chamber; variable measurable means to clamp the rotor to resist rotation thereof, comprising a lever graduated in relation to the operative surface of said rotor and a weight movable along said lever; a temperature recording index responsive to said fluid to describe the temperature curve on a moving strip; a strip movable in time relation to receive the curve, and means for moving the strip.

20. In a machine of the character described the combination of a driving member; a lubricatable member to be driven thereby; a yielding means for connecting the said members, axially movable in consequence of predetermined resistance imposed on said driven member; a recording index to describe a curve characteristic of the resistance imposed on said driven member; means for moving said index responsive to the rotative displacement of the driving and driven members, an index to describe a curve characteristic of temperature variations of said driven member coördinately operative with said resistance recording index; a constantly moving strip upon which to inscribe both curves, and means for moving the strip.

21. In a machine of the character described the combination of a driving member; a lubricatable member to be driven thereby; a stationary jacket bearing in which said driven member is confined; a yielding means for connecting said driving and driven members, axially movable in consequence of resistance imposed on said driven member; a recording index to describe a curve characteristic of the resistance imposed on the said driven member; adjustable means to impose variable resistance on said driven member; an index to describe a curve characteristic of temperature variations of said driven member coördinately operative with said resistance recording index; temperature responsive means connected with said jacket, a moving strip upon which to inscribe both curves and means for moving the strip.

22. In a machine of the character described the combination of a driving member, a lubricatable elongated arbor to be driven thereby; a yielding means for connecting said member and arbor, movable in consequence of resistance imposed on the driven member; a recording index to describe a curve indicative of the torque stress imposed upon said arbor by said resistance; a two-part box affording bearing for said arbor; each part having a chamber partly encircling the said arbor; a temperature-responsive fluid in one chamber; a recording index controlled by said fluid, and conduits communicating with the other chamber through which to circulate a heating or cooling agent.

23. In a machine of the character described the combination of a driving member; a lubricatable, elongated arbor to be driven thereby; a yielding means for connecting said member and arbor movable in consequence of resistance imposed on said driven member; a relatively stationary bearing member for imposing resistance on said driven member; a recording index to describe a curve indicative of the torque stress imposed on said arbor, by said resistance; a two-part box affording bearing for said arbor, one part loose with respect to the other; a graduated lever pivoted to the fixed part of the box and having a bearing on each side of the loose part to poise the latter on the arbor and whereby to oppose rotation of said arbor and a weight movable on said lever to vary the resistance thus imposed on said arbor.

24. In combination with a machine of the character described, a chart, whereupon to continuously record resistance to rotation of a lubricated part and the temperature of the lubricant under test, which consists of a strip having a series of spaced-apart longitudinally-extending lines bearing numerals indicative of torque and temperature and transversely-extending spaced-apart lines indicative of time periods and having perforations at selected time-intervals through which a signal instigating member may pass to establish a signal at corresponding intervals.

25. In combination with a machine of the character described, a chart, whereupon to continuously record resistance to rotation of a lubricated part and the temperature of a lubricant under test, which consists of a strip having a series of spaced-apart longitudinally-extending lines bearing numerals indicative of torque and temperature and transversely arcuate spaced-apart lines indicative of time periods and marginal edges containing perforations at selected time-intervals through which an electric circuit may be closed to produce signals at corresponding intervals.

26. In combination with a machine of the character described, a chart, whereupon to continuously record resistance to rotation of a lubricated part and the temperature of a lubricant under test, which consists of a strip having a series of spaced-apart longitudinally-extending lines bearing numerals indicative of torque and temperature, transversely arcuate spaced-apart lines indicative of time periods and marginal edges containing perforations at selected time-intervals through which an electric circuit may be closed to produce signals at corresponding intervals and having legends in said margins of suggested data of a test being recorded on the chart.

27. In combination with a machine of the character described, a chart, whereupon to continuously record resistance to rotation of a lubricated part and the temperature of a lubricant under test, which consists of a strip having a series of spaced-apart longitudinally-extending lines bearing numerals indicative of torque and temperature and transversely-extending spaced-apart lines indicative of time periods and perforations at selected time intervals through which a member may pass to operate a signal.

In testimony whereof I hereunto set my hand in the presence of two subscribing witnesses.

VANDIVER J. VAN HORN.

In the presence of—
STANLEY W. COOK,
FORÉE BAIN.